United States Patent [19]

Sekiya et al.

[11] Patent Number: 5,513,523

[45] Date of Patent: May 7, 1996

[54] PNEUMATIC TIRE PRESSURE CHANGE DETECTING SYSTEM COMPARING WHEEL SPEEDS AND WEIGHTING DETECTION BASED ON RUNNING CONDITIONS

[75] Inventors: Shigenobu Sekiya; Takashi Nishihara; Toru Ikeda; Shuji Shiraishi, all of Saitama, Japan

[73] Assignee: Honda Giken Kogyo Kabushiki Kaisha, Tokyo, Japan

[21] Appl. No.: 308,440

[22] Filed: Sep. 19, 1994

[30] Foreign Application Priority Data

Sep. 30, 1993 [JP] Japan ................................. 5-245730

[51] Int. Cl.$^6$ ........................ G01M 17/02; E01C 23/02
[52] U.S. Cl. ................................ 73/146; 340/444
[58] Field of Search .................... 73/146; 340/444

[56] References Cited

U.S. PATENT DOCUMENTS 5,218,862  6/1993  Hurrell, II et al. ................ 340/444 X

FOREIGN PATENT DOCUMENTS 291217   11/1988  European Pat. Off. .
497120   8/1992   European Pat. Off. .
554131   8/1993   European Pat. Off. .
54-33772 3/1979   Japan ................................ 340/444
2246461  1/1992   United Kingdom ................ 340/444

*Primary Examiner*—Richard Chilcot
*Assistant Examiner*—Joseph L. Felber
*Attorney, Agent, or Firm*—Armstrong, Westerman, Hattori, McLeland & Naughton

[57] ABSTRACT

A subtractor calculates an actual wheel speed difference between rotational speeds of left and right wheels on a motor vehicle, and a steering angle converter calculates an actual steering angle from the actual wheel speed difference. The difference between the actual steering angle and an adequate steering angle which is produced based on a lateral acceleration is compared with a predetermined reference range. If the difference between the actual and adequate steering angles exceeds the predetermined reference range, then the pneumatic pressure of a tire on one of the left and right wheels is determined as being lowered. In the steering angle converter, a weight value is established according to a running condition of the motor vehicle, and the calculated actual steering angle or comparative sensitivity is varied according to the weight value. Since the comparative sensitivity is varied according to the running condition, a reduction in the pneumatic pressure of the tire can be detected even under running conditions which lead to large errors.

8 Claims, 4 Drawing Sheets

PNEUMATIC TIRE PRESSURE CHANGE DETECTING SYSTEM COMPARING WHEEL SPEEDS AND WEIGHTING DETECTION BASED ON RUNNING CONDITIONS

BACKGROUND OF THE INVENTION

1. Field of the Invention

The present invention relates to a system for detecting a change in the pneumatic pressure of a tire on a motor vehicle.

2. Description of the Prior Art

Known apparatus and methods for detecting a change in the pneumatic pressure of a tire include a tire pressure detector having a pressure sensor attached to a wheel as disclosed in Japanese patent publication No. 56-10202, a method for detecting a reduction in the pneumatic pressure of a tire by comparing the detected speeds of wheels as disclosed in Japanese laid-open patent publication No. 63-305011, and a system for detecting a reduction in the pneumatic pressure of a tire by comparing the difference between wheel speeds and a motion condition of the motor vehicle as disclosed in Japanese patent application No. 4-46016.

In the system disclosed in Japanese patent application No. 4-46016, since any change in the wheel speeds which is caused by a reduction in the pneumatic pressure of the tire is of a very small value, it may be obscured or masked by errors contained in the wheel speeds depending on running conditions of the motor vehicle.

Therefore, highly accurate detection of any change which is brought about in the wheel speeds by a reduction in the pneumatic pressure of the tire requires that errors contained in the wheel speeds depending on running conditions of the motor vehicle be removed. One problem with such an approach is that if all running conditions which lead to large wheel speed errors are left out of consideration, then any pneumatic tire pressure reduction cannot be detected under those running conditions. There has been a demand for a system capable of detecting the pneumatic pressure of a tire under running conditions leading to large errors and upon a failure such as a brake failure which greatly affects running conditions.

SUMMARY OF THE INVENTION

It is therefore an object of the present invention to provide a pneumatic tire pressure change detecting system which can detect a change in the pneumatic pressure of a tire under running conditions leading to large errors and upon a failure such as a brake failure which greatly affects running conditions.

According to the present invention, there is provided a system for detecting a change in the pneumatic pressure of a tire on a motor vehicle, comprising wheel speed difference detecting means for detecting an actual wheel speed difference between rotational speeds of left and right wheels on a motor vehicle, motion condition detecting means for detecting a motion condition of the motor vehicle, adequate wheel speed difference calculating means for calculating an adequate wheel speed difference based on an output signal from the motion condition detecting means, comparing means for comparing the actual wheel speed difference and the adequate wheel speed difference with each other and determining the pneumatic pressure of a tire of one of the left and right wheels as being lowered if a difference between the actual wheel speed difference and the adequate wheel speed difference exceeds a predetermined value, running condition determining means for determining a running condition of the motor vehicle, and comparative sensitivity modifying means for modifying a comparative sensitivity with which a reduction in the pneumatic pressure of the tire is determined, according to the running condition determined by the running condition determining means. The system may further comprise brake detecting means for detecting a braking of the motor vehicle and supplying a signal indicative of the detected braking to the running condition determining means, and failure detecting means for detecting a failure of the brake detecting means, the comparative sensitivity modifying means comprising means for modifying the comparative sensitivity according to the running condition determined by the running condition determining means if the failure detecting means detects a failure of the brake detecting means. The system may further comprise first steering angle converting means for calculating an actual steering angle from the actual wheel speed difference, the adequate wheel speed difference calculating means comprising second steering angle converting means for calculating an adequate steering angle from the adequate wheel speed difference, the comparing means comprising means for comparing the actual steering angle and the adequate steering angle with each other and determining the pneumatic pressure of the tire as being lowered if a difference between the actual steering angle and the adequate steering angle exceeds a predetermined value.

According to the present invention, there is provided a system for detecting a change in the pneumatic pressure of a tire on a motor vehicle, comprising wheel speed difference detecting means for detecting an actual wheel speed difference between rotational speeds of front and rear wheels on a motor vehicle, motion condition detecting means for detecting a motion condition of the motor vehicle, adequate wheel speed difference calculating means for calculating an adequate wheel speed difference based on an output signal from the motion condition detecting means, comparing means for comparing the actual wheel speed difference and the adequate wheel speed difference with each other and determining the pneumatic pressure of a tire of one of the front and rear wheels as being lowered if a difference between the actual wheel speed difference and the adequate wheel speed difference exceeds a predetermined value, running condition determining means for determining a running condition of the motor vehicle, and comparative sensitivity modifying means for modifying a comparative sensitivity with which a reduction in the pneumatic pressure of the tire is determined, according to the running condition determined by the running condition determining means. The system may further comprise brake detecting means for detecting a braking of the motor vehicle and supplying a signal indicative of the detected braking to the running condition determining means, and failure detecting means for detecting a failure of the brake detecting means, the comparative sensitivity modifying means comprising means for modifying the comparative sensitivity according to the running condition determined by the running condition determining means if the failure detecting means detects a failure of the brake detecting means. The system may further comprise actual slippage detecting means for detecting an actual amount of slippage between the front and rear wheels, the adequate wheel speed difference calculating means comprising slippage estimating means for producing an estimated amount of slippage between the front and rear wheels, the comparing means comprising means for comparing the actual amount of slippage and the estimated amount of slippage with each other and determining the pneumatic pressure of the tire as being lowered if a difference between the actual amount of slippage and the estimated amount of slippage exceeds a predetermined value.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
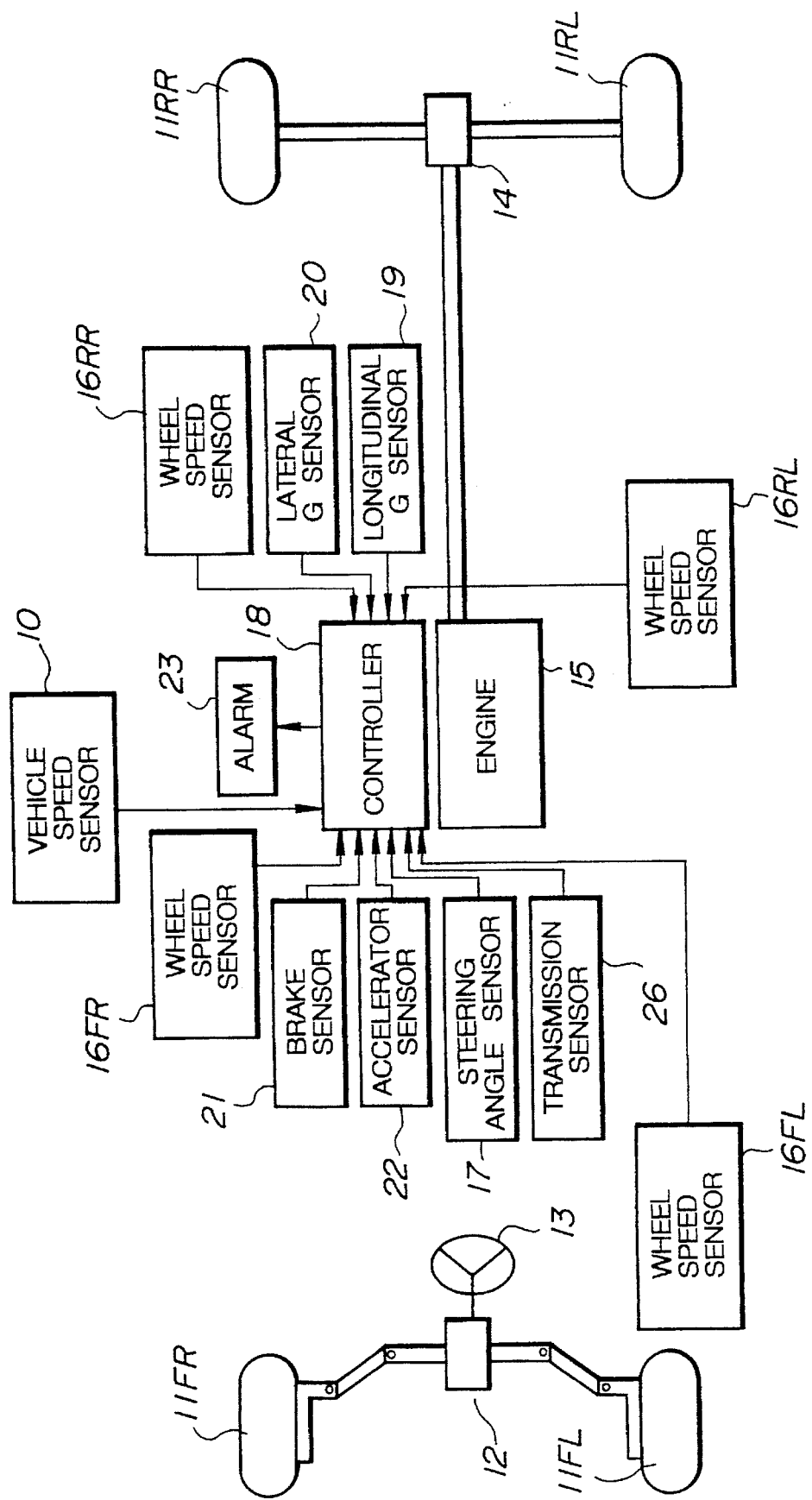
FIG. 1 is a block diagram of a pneumatic tire pressure change detecting system according to the present invention which is incorporated in a rear-wheel-drive motor vehicle.

As shown in FIG. 1, a rear-wheel-drive motor vehicle which incorporates a pneumatic tire pressure change detecting system according to the present invention has a front left wheel 11FL, a front right wheel 11FR, a rear left wheel 11RL, and a rear right wheel 11RR. The front left and right wheels 11FL, 11FR are operatively coupled to a steering wheel 13 through a known steering mechanism 12, and can be steered by the driver of the motor vehicle through the steering wheel 13. The rear left and right wheels 11RL, 11RR are operatively coupled to a power unit or engine 15 through a final speed reducer mechanism 14, and can be driven to propel the motor vehicle by the engine 15.

The front left and right wheels 11FL, 11FR and the rear left and right wheels 11RL, 11RR are associated with respective front left and right wheel speed sensors 16FL, 16FR and rear left and right wheel speed sensors 16RL, 16RR for detecting the rotational speeds of the front left and right wheels 11FL, 11FR and the rear left and right wheels 11RL, 11RR, respectively. The steering mechanism 12 is associated with a steering angle sensor 17 for detecting a steering angle of the steering mechanism 12. The front left and right wheel speed sensors 16FL, 16FR and the rear left and right wheel speed sensors 16RL, 16RR, and the steering angle sensor 17 are electrically connected to a controller 18. To the controller 18, there are also electrically connected a lateral G sensor 20 for detecting a lateral acceleration of the motor vehicle, a longitudinal or fore-and-aft G sensor 19 for detecting a longitudinal acceleration of the motor vehicle, a brake sensor 21 for detecting a depression of a brake pedal (not shown) of the motor vehicle, an accelerator sensor 22 for detecting the amount of the stroke of a depression of an accelerator pedal (not shown) of the motor vehicle, and a transmission sensor 26 for detecting a selected gear position of a transmission (not shown) combined with the engine 15. An alarm 23 which typically comprises warning lamps and a buzzer, and a vehicle speed sensor 10 for detecting a speed of the motor vehicle are also electrically connected to the controller 18. The longitudinal G sensor 19 may be replaced with a differentiating circuit or the like for calculating rates of change of the rotational speeds of the road wheels, i.e., accelerations thereof.

The vehicle speed sensor 10 may be replaced with a circuit for calculating an average value of the output signals from the front left and right wheel speed sensors 16FL, 16FR to produce a vehicle speed represented by the average rotational speed of the front left and right wheels 11FL, 11FR.

Figure 2:
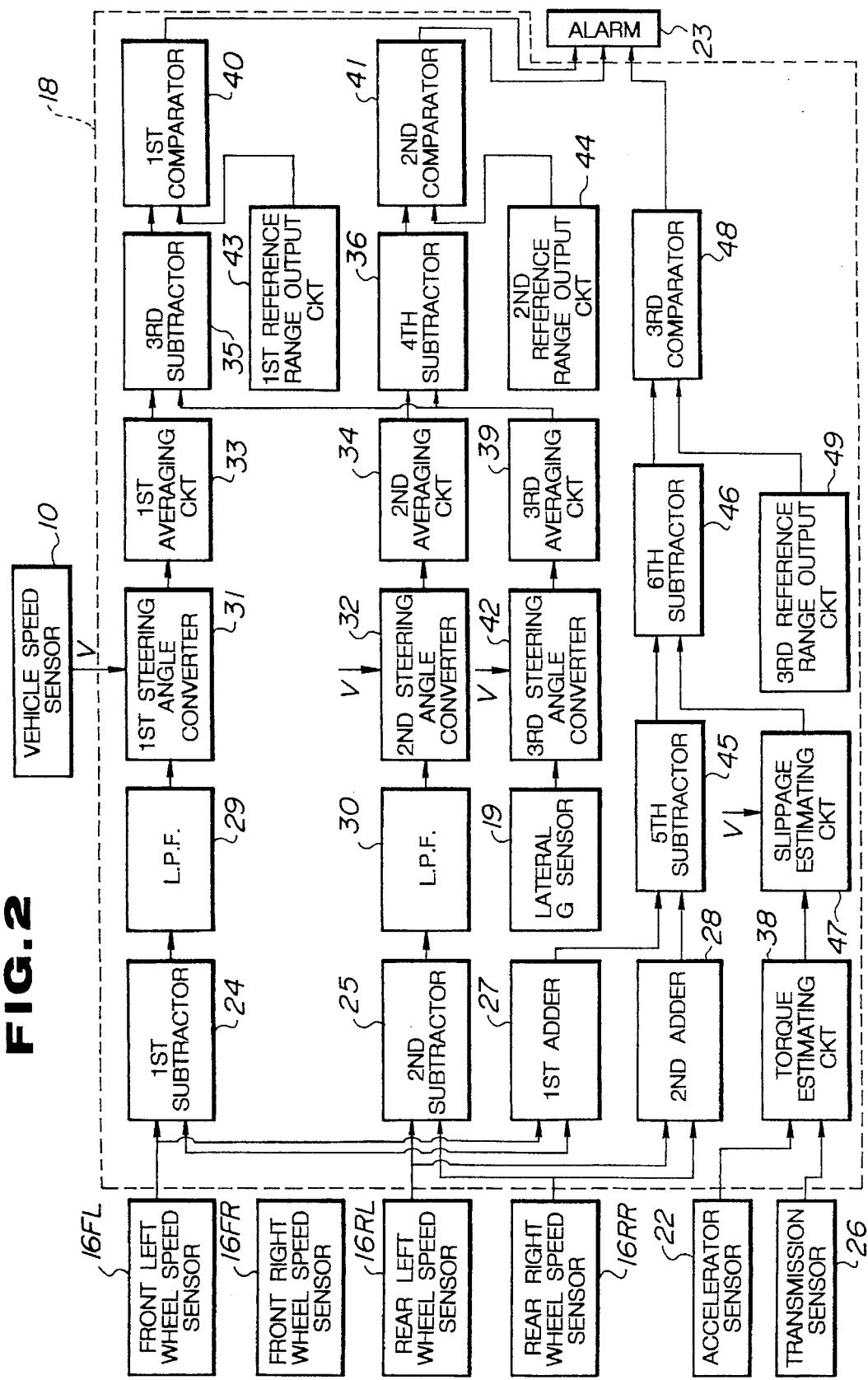
FIG. 2 is a detailed block diagram of the pneumatic tire pressure change detecting system shown in FIG. 1.

As shown in FIG. 2, the controller 18 has a first subtractor 24 and a first adder 27 which are connected to the front left and right wheel speed sensors 16FL, 16FR, and a second subtractor 25 and a second adder 28 which are connected to the rear left and right wheel speed sensors 16RL, 16RR. The first subtractor 24 subtracts an output signal of the front right wheel speed sensor 16FR from an output signal of the front left wheel speed sensor 16FL to produce and output a differential signal representative of the difference between the rotational speeds of the front left and right wheels 11FL, 11FR. The first subtractor 24 is connected through a low-pass filter 29 to a first steering angle converter 31. The second subtractor 25 subtracts an output signal of the rear right wheel speed sensor 16RR from an output signal of the rear left wheel speed sensor 16RL to produce and output a differential signal representative of the difference between the rotational speeds of the rear left and right wheels 11RL, 11RR. The second subtractor 25 is connected through a low-pass filter 30 to a second steering angle converter 32.

The first steering angle converter 31 is supplied with a vehicle speed signal V from the vehicle speed sensor 10, and has an output terminal connected to a first averaging circuit 33. The first steering angle converter 31 calculates a steering angle from the differential signal from the first subtractor 24 and the vehicle speed signal V from the vehicle speed sensor 10, and applies a steering angle signal indicative of the calculated steering angle to the first averaging circuit 33. The second steering angle converter 32 is also supplied with the vehicle speed signal V from the vehicle speed sensor 10, and has an output terminal connected to a second averaging circuit 34. The second steering angle converter 32 calculates a steering angle from the differential signal from the second subtractor 25 and the vehicle speed signal V from the vehicle speed sensor 10, and applies a steering angle signal indicative of the calculated steering angle to the second averaging circuit 34.

Each of the first and second steering angle converters 31, 32 has a function to weight the calculated steering angle, as described later on.

The first averaging circuit 33 has an output terminal connected to a third subtractor 35. The first averaging circuit 33 stores output signals from the first steering angle converter 31 over a predetermined period of time, updates stored oldest data each time it is supplied with an output signal from the first steering angle converter 31, and calculates an average value of output signals from the first steering angle converter 31 for the predetermined period of time. The first averaging circuit 33 outputs a signal indicative of an average value, which represents an estimated steering angle, of calculated steering angles for the predetermined period of time to the third subtractor 35.

Similarly, the second averaging circuit 34 has an output terminal connected to a fourth subtractor 36. The second averaging circuit 34 stores output signals from the second steering angle converter 32 over a predetermined period of time, updates stored oldest data each time it is supplied with an output signal from the second steering angle converter 32, and calculates an average value of output signals from the second steering angle converter 32 over the predetermined period of time. The second averaging circuit 34 outputs a signal indicative of an average value, which represents an estimated steering angle, of calculated steering angles over the predetermined period of time to the fourth subtractor 36.

The controller 18 also has a torque estimating circuit 38 for estimating an output torque of the engine 15 based on an output signal from the accelerator sensor 22, as described later on.

The third subtractor 35 has an input terminal connected to the first averaging circuit 33, another input terminal connected to a third averaging circuit 39, and an output terminal to a first comparator 40. The third subtractor 35 is supplied with the signal representative of an estimated steering angle from the first averaging circuit 33 and a signal representative of an adequate steering angle (described later on) from the third averaging circuit 39, and subtracts one of the supplied signals from the other to produce a signal indicative of the angular difference between the estimated steering angle and the adequate steering angle.

Similarly, the fourth subtractor 36 has an input terminal connected to the second averaging circuit 34, another input terminal connected to the third averaging circuit 39, and an output terminal to a second comparator 41. The fourth subtractor 36 is supplied with the signal representative of an estimated steering angle from the second averaging circuit 34 and the signal representative of an adequate steering angle from the third averaging circuit 39, and subtracts one of the supplied signals from the other to produce a signal indicative of the angular difference between the estimated steering angle and the adequate steering angle.

The angular difference signal produced by each of the third and fourth subtractors 35, 36 has a sign based on the rotatable speed of one of the left and right wheels which is used as a reference. If the rotatable speed of one of the left and right wheels is higher than the rotational speed of the other, then the angular difference signal is positive, and if the rotatable speed of one of the left and right wheels is lower than the rotational speed of the other, then the angular difference signal is negative.

The third averaging circuit 39 has an input terminal connected to a third steering angle converter 42 whose input terminal is connected to the lateral G sensor 19 and the vehicle speed sensor 10. The third steering angle converter 42 stores a data table of lateral accelerations vs. steering angles with the vehicle speed as a parameter at the time the pneumatic tire pressures of the wheels 11FL, 11FR, 11RL, 11RR are normal. Based on the motions conditions of a lateral acceleration detected by the lateral G sensor 20 and a vehicle speed detected by the vehicle speed sensor 10, the third steering angle converter 42 searches the stored data table for an adequate steering angle, i.e., a steering angle at the time the pneumatic tire pressures of the wheels 11FL, 11FR, 11RL, 11RR are normal, and applies a signal indicative of the adequate steering angle to the third averaging circuit 39. The third averaging circuit 39 calculates an average value of adequate steering angles over a predetermined period of time, and outputs a signal representative of an average adequate steering angle to the third and fourth subtractors 35, 36.

As described later on, the third steering angle converter 42 has a function to weight the adequate steering angle.

The first comparator 40 has an input terminal connected to the third subtractor 35, another input terminal connected to a first reference range output circuit 43, and an output terminal connected to the alarm 23. The first reference range output circuit 43 outputs a signal indicative of a predetermined reference range about a value 0 to the first comparator 40. The first comparator 40 compares an output signal from the third subtractor 35 with the predetermined reference range from the first reference range output circuit 43. If the output signal from the third subtractor 35 does not fall within the predetermined reference range from the first reference range output circuit 43, then the first comparator 40 supplies the alarm 23 with an actuating signal that indicates whether the output signal from the third subtractor 35 exceeds the predetermined reference range in a positive or negative direction. More specifically, the output signal from the third subtractor 35 is positive or negative depending on which one of the rotational speeds of the front left and right wheels 11FL, 11FR is higher than the other, as described above. Therefore, if the output signal from the third subtractor 35 exceeds the predetermined reference range in a positive direction, for example, then it is determined that the pneumatic tire pressure of the front left wheel 11FL is lowered, and if the output signal from the third subtractor 35 exceeds the predetermined reference range in a negative direction, for example, then it is determined that the pneumatic tire pressure of the front right wheel 11FR is lowered. As a result, the first comparator 40 produces an actuating signal representing which one of the pneumatic tire pressures of the front left and right wheels 11FL, 11FR is lowered.

Likewise, the second comparator 41 has an input terminal connected to the fourth subtractor 36, another input terminal connected to a second reference range output circuit 44, and an output terminal connected to the alarm 23. The second reference range output circuit 44 outputs a signal indicative of a predetermined reference range about a value 0 to the second comparator 41. The second comparator 41 compares an output signal from the fourth subtractor 36 with the predetermined reference range from the second reference range output circuit 44. If the output signal from the fourth subtractor 36 does not fall within the predetermined reference range from the second reference range output circuit 44, then the second comparator 41 supplies the alarm 23 with an actuating signal that indicates whether the output signal from the fourth subtractor 36 exceeds the predetermined reference range in a positive or negative direction, i.e., an actuating signal representing which one of the pneumatic tire pressures of the rear left and right wheels 11RL, 11RR is lowered.

The first and second adders 27, 28 have respective output terminals connected to a fifth subtractor 45 which is in turn connected to a sixth subtractor 46. The fifth subtractor 45 subtracts an output signal of the second adder 28 from an output signal of the first adder 27 thereby calculating the difference between the rotational speeds of the front and rear wheels, i.e., an actual amount of slippage between the front and rear wheels per unit time. The fifth subtractor 45 outputs a signal indicative of the actual amount of slippage between the front and rear wheels to the sixth subtractor 46. The sixth subtractor 46 has an input terminal connected to the fifth subtractor 45, another input terminal connected to a slippage estimating circuit 47, and an output terminal connected to a third comparator 48. The sixth subtractor 46 is supplied with an output signal indicative of the actual amount of slippage between the front and rear wheels from the fifth subtractor 45 and an output signal indicative of an estimated amount of slippage from the slippage estimating circuit 47, and outputs a signal representing the difference (slippage difference) between the actual amount of slippage and the estimated amount of slippage to the third comparator 48.

As described later on, the sixth subtractor 46 has a function to weight the difference between the rotational speeds of the front and rear wheels.

The slippage estimating circuit 47 has an input terminal connected to the torque estimating circuit 38 and an input terminal connected to the vehicle speed sensor 10. The torque estimating circuit 38 receives motion condition information through its input terminal, which is connected to the accelerator sensor 22 and the transmission sensor 26. The torque estimating circuit 38 stores a first data table of engine output torque vs. depression stroke of the accelerator pedal and a second data table of drive forces for the rear left and right wheels 11RL, 11RR vs. engine output torques with the transmission gear position as a parameter. The torque estimating circuit 38 searches the first data table for an engine output torque based on the depression stroke of the accelerator pedal detected by the accelerator sensor 22, and then searches the second data table for a drive force for the rear left and right wheels 11RL, 11RR based on the determined engine output torque with respect to the transmission gear position detected by the transmission sensor 26. The torque estimating circuit 38 outputs a signal indicative of the determined drive force to the slippage estimating circuit 47. The slippage estimating circuit 47 either calculates an estimated amount of slippage of the rear left and right wheels 11RL, 11RR from the drive force and the vehicle speed or determines an estimated amount of slippage of the rear left and right wheels 11RL, 11RR in a look-up table, and then outputs a signal representing the estimated amount of slippage to the sixth subtractor 46.

The third comparator 48 has an input terminal connected to the sixth subtractor 46, another input terminal connected to a third reference range output circuit 49, and an output terminal connected to the alarm 23. The third reference range output circuit 49 outputs a signal indicative of a predetermined reference range for determining whether any one of the pneumatic tire pressures of the front and rear wheels is lowered. The third comparator 48 compares an output signal from the sixth subtractor 46 and an output signal from the third reference range output circuit 49, and outputs an actuating signal depending on whether the output signal from the sixth subtractor 46 exceeds the predetermined reference range from the third reference range output circuit 49 in a positive or negative direction. Specifically, when the difference between the estimated amount of slippage and the actual amount of slippage exceeds the predetermined reference range, the third comparator 48 supplies an actuating signal depending on whether the slippage difference exceeds the predetermined reference range in a positive or negative direction to the alarm 23.

The warning lamps of the alarm 23 correspond respectively to the front left and right wheels 11FL, 11FR and the rear left and right wheels 11RL, 11RR. In response to an actuating signal supplied to either one of the comparators 40, 41, 48, the alarm 23 energizes the corresponding warning lamp to continuously or intermittently turn it on, and simultaneously energizes the buzzer, for thereby indicating a reduction in the pneumatic tire pressure of one of the wheels to the driver of the motor vehicle.

As described above, each of the first steering angle converter 31, the second steering angle converter 32, the third steering angle converter 42, and the sixth subtractor 46 has a weighting function. In each of these components, the weighting function is performed by a running condition determining circuit and a comparative sensitivity modifying circuit, as described below.

Figure 3:
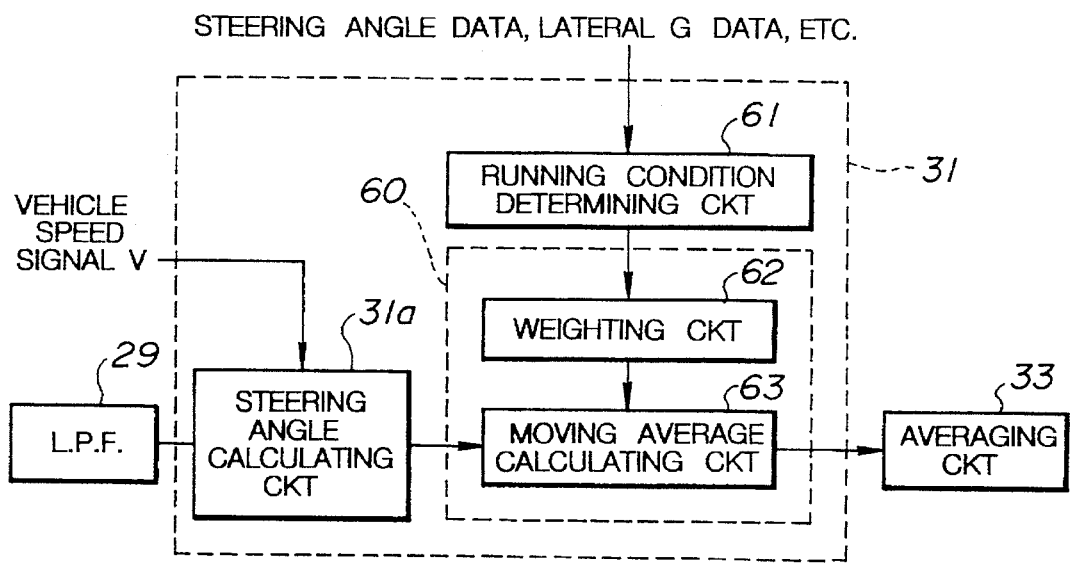
FIG. 3 is a block diagram of a first steering angle converter according to a first embodiment of the present invention.

FIG. 3 shows in block form a detailed circuit arrangement of the first steering angle converter 31 according to a first embodiment of the present invention. Each of the second steering angle converter 32, the third steering angle converter 42, and the sixth subtractor 46 also has a circuit arrangement which is the same as the circuit arrangement shown in FIG. 3.

As shown in FIG. 3, the first steering angle converter 31 has a running condition determining circuit 61 which is supplied with steering angle data from the steering angle sensor 17, for example. A weighting circuit 62 produces a weighting value corresponding to the steering angle data from the running condition determining circuit 61. The first steering angle converter 31 also has a steering angle calculating circuit 31a for calculating a steering angle from the difference between the rotational speeds of the front left and right wheels 11FL, 11FR and the vehicle speed signal V from the vehicle speed sensor 10. The calculated steering angle (FID) is weighted by a moving average calculating circuit 63 according to the weight value obtained by the weighing circuit 62. The weighting circuit 62 and the moving average calculating circuit 63 jointly serve as a comparative sensitivity modifying circuit 60 for modifying a comparative sensitivity with which a reduction in the pneumatic tire pressure is determined. In the first steering angle converter 31, the comparative sensitivity is related to the steering angle calculated from the difference between the rotational speeds of the front left and right wheels 11FL, 11FR. The comparative sensitivity can be varied by varying a weight WT (described later on).

The weighting circuit 62 determines a moving average of a pneumatic tire pressure variable with a calculating circuit therein according to the equation (1) given below.

$$X(m) = \frac{WT \cdot Xa}{\alpha} + \frac{\alpha - WT}{\alpha} \cdot X(m-1) \qquad (1)$$

where $X(m)$ is the moving average of a present pneumatic tire pressure variable, WT is the weight value, $Xa$ is the present pneumatic tire pressure variable, $\alpha$ is the updating coefficient for the moving average, and $X(m-1)$ is the moving average of a preceding pneumatic tire pressure variable.

The pneumatic tire pressure variable may be of the calculated steering angle (FID), the difference (RID) between the rotational speeds of the rear wheels, the adequate steering angle (G) based on the motion condition of the output signal from the lateral G sensor 19, the difference (CVW) between the rotational speeds of the front and rear wheels, or the difference (KIDD) between the steering angles of the front and rear wheels.

The weight value WT ranges from 0 to 1. The weight value WT is set to a value for serving the two contradictory purposes of minimizing errors and quickly detecting a reduction in the pneumatic tire pressure, based on data produced by actually running the motor vehicle.

According to the above equation (1), if the weight value WT is fractional, then a moving average is sought. When a moving average is calculated, the calculated steering angle, i.e., the difference (FID) between the rotational speeds of the front wheels, is weighted by the moving average calculating circuit 63 according to the calculated moving average $X(m)$.

In the second steering angle converter 32, the difference (RID) between the rotational speeds of the rear wheels is weighted. In the third steering angle converter 42, the adequate steering angle (G) based on the motion condition of the output signal from the lateral G sensor 19 is weighted. In the sixth subtractor 46, the difference (CVW) between the rotational speeds of the front and rear wheels is weighted.

The running condition determining circuit 61 may be supplied with lateral acceleration data from the lateral G sensor 19, vehicle speed data from the vehicle speed sensor 10, drive torque data, yaw rate variation data, or the like, rather than the steering angle data from the steering angle sensor 17.

In the illustrated embodiment, each of the first steering angle converter 31, the second steering angle converter 32, the third steering angle converter 42, and the sixth subtractor 46 has a weighting function. However, the present invention is not limited to such a weighting function. For example, the reference range produced by each of the reference range output circuits 43, 44, 49 may be weighted.

Since the calculated steering angle (FID), the difference (RID) between the rotational speeds of the rear wheels, the adequate steering angle (G) based on the output signal from the lateral G sensor 19, the difference (CVW) between the rotational speeds of the front and rear wheels, or the difference (KIDD) between the steering angles of the front and rear wheels is weighted based on running conditions, it is possible for the pneumatic tire pressure change detecting system according to the present invention to detect a reduction in the pneumatic tire pressure even under running conditions which lead to large errors.

Figure 4:
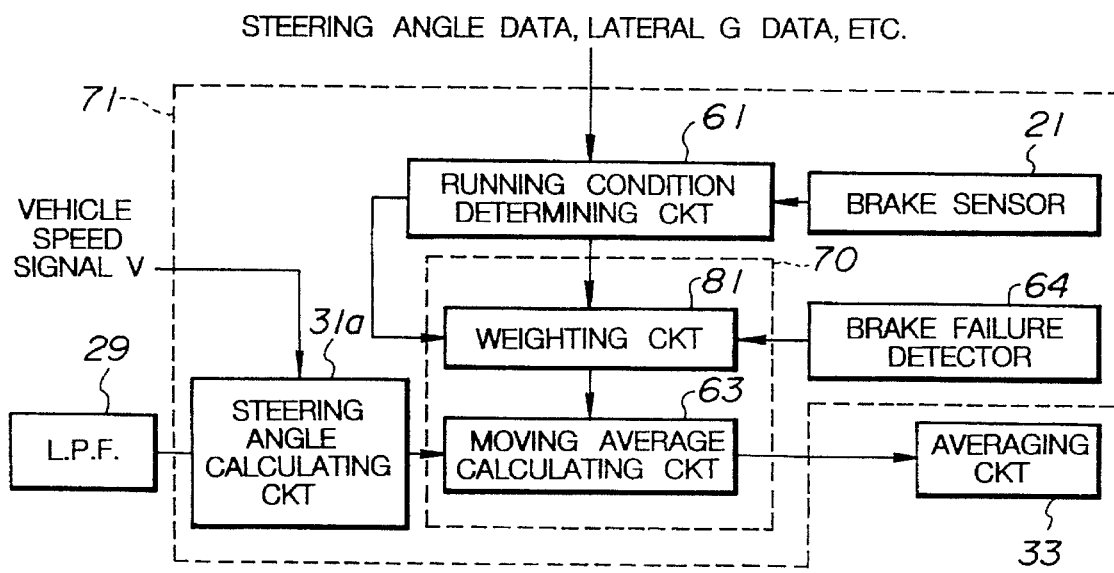
FIG. 4 is a block diagram of a first steering angle converter according to a second embodiment of the present invention.

FIG. 4 shows in block form a detailed circuit arrangement of a first steering angle converter 71 according to a second embodiment of the present invention. The first steering angle converter 71 has a weighting function and also a function to modify a weight value.

The first steering angle converter 71 shown in FIG. 4 differs from the first steering angle converter 31 shown in FIG. 3 in that the running condition determining circuit 61 is supplied with a braking signal from the brake sensor 21, a weighting circuit 81 is employed in place of the weighting circuit 62, and the weighing circuit 81 is supplied with a brake failure signal from a brake failure detector 64 and an output signal from the running condition determining circuit 61. The weighing circuit 81 and the moving average calculating circuit 63 jointly serve as a comparative sensitivity modifying circuit 70.

In the first steering angle converter 71, when a brake failure signal is supplied from the brake failure detector 64 to the weighting circuit 81, a weighted moving average is modified.

The brake failure detector 64 is supplied with a detected signal from the brake sensor 21 and data of a longitudinal acceleration, i.e., an acceleration converted from the difference between the front wheel differential speed and the rear wheel differential speed, and outputs a brake failure signal from a predetermined data table based on the supplied signal and data. The weighting circuit 81 comprises a calculating circuit for modifying a weight value WT based on the brake failure signal and the longitudinal acceleration. Each of the brake failure detector 64 and the weighting circuit 81 may be implemented by a conventional logic IC or ROM.

Figure 5:
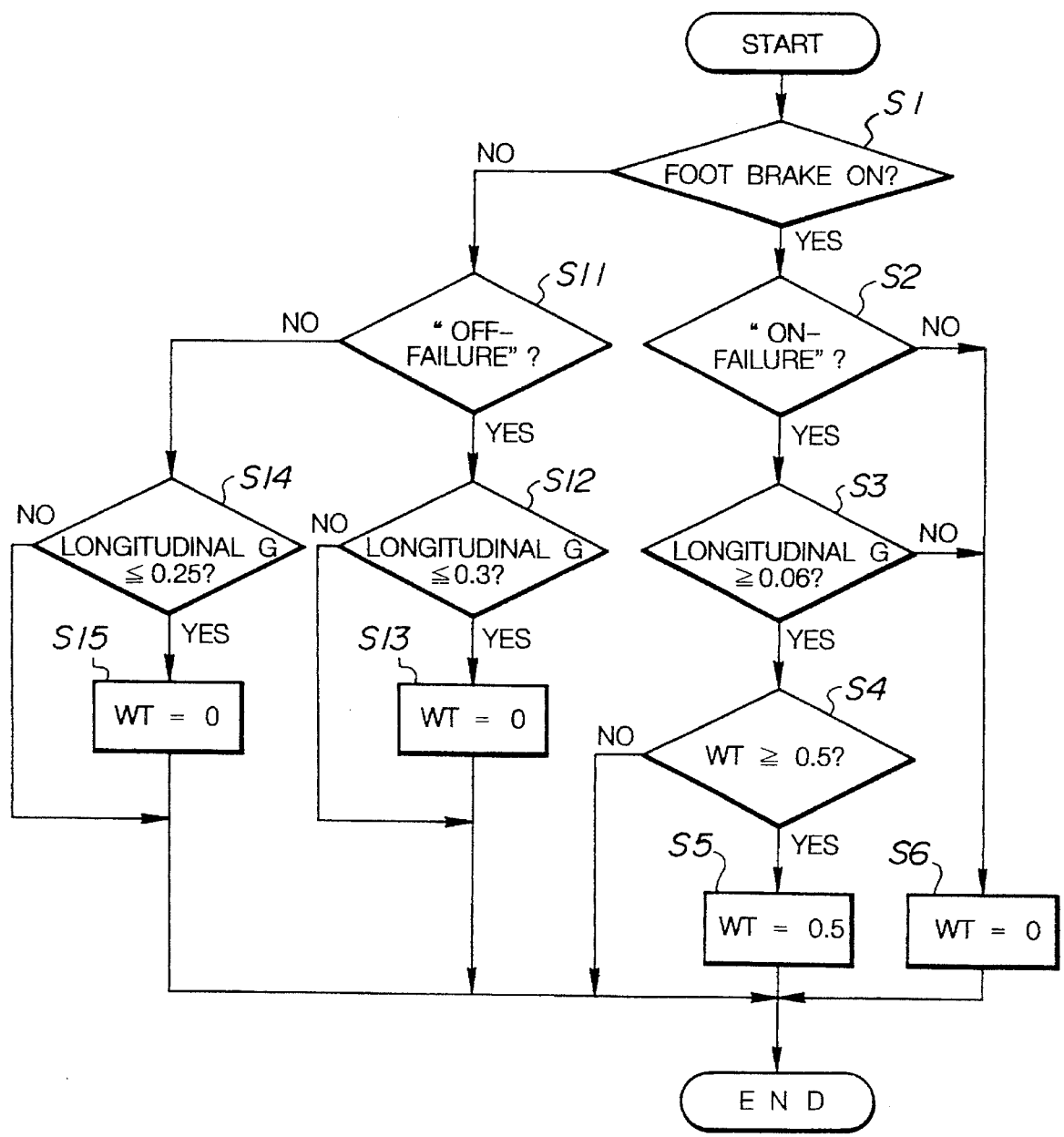
FIG. 5 is a flowchart of a weight value modifying sequence of the first steering angle converter according to the second embodiment of the present invention.

A process of modifying a weight value with the first steering angle converter 71 will be described below with reference to FIG. 5.

The brake sensor 21 determines whether a foot brake is applied, i.e., turned on, or not, in a step S1. If the foot brake is turned on, then the brake failure detector 64 determines whether the foot brake suffers an "ON-failure" or not in a step S2. The "ON-failure" is a failure condition in which the foot brake is turned on or applied even though the brake pedal is not depressed. The foot brake is determined as being subjected to the "ON-failure" when the foot brake is turned on and the motor vehicle undergoes an acceleration which is expected to occur at the time it is accelerated, for about 5 seconds. The "ON-failure" is canceled when the foot brake is turned off for about 5 seconds.

If the "ON-failure" is detected in the step S2, then control proceeds to a step S3 which determines whether or not the longitudinal acceleration is 0.06 or more, i.e., whether or not the foot brake is applied. If the longitudinal acceleration is 0.06 or more, then a step S4 determines whether or not the present weight value WT is 0.5 or more. If the present weight value WT is 0.5 or more, then the weight value WT is set to 0.5 in a step S5. If the "ON-failure" is not detected in the step S2, or if longitudinal acceleration is less than 0.06, i.e., if the foot brake is not applied, in the step S3, then the weight value WT is set to 0 in a step S6. If the weight value WT is less than 0.5 in the step S4, then the present weight value WT is maintained.

If the foot brake is not turned on in the step S1, then control goes to a step S11. In the step S11, the brake failure detector 64 determines whether the foot brake suffers an "OFF-failure" or not. The "OFF-failure" is a failure condition in which the foot brake is turned off or not applied even though the brake pedal is depressed. The foot brake is determined as being subjected to the "OFF-failure" when the foot brake is never turned on a predetermined period of time after the brake pedal is depressed. The "OFF-failure" is canceled when the foot brake is turned on.

If the "OFF-failure" is detected in the step S11, then control proceeds to a step S12 which determines whether or not the longitudinal acceleration is 0.3 or less. If the longitudinal acceleration is 0.3 or less, i.e., if the motor vehicle is running, then the present weight value WT is set to 0 in a step S13.

If the "OFF-failure" is not detected in the step S11, then a step S14 determines whether or not the longitudinal acceleration is 0.25 or less. If the longitudinal acceleration is 0.25 or less, i.e., if the motor vehicle is running, then the present weight value WT is set to 0 in a step S15.

If the longitudinal acceleration exceeds 0.3, i.e., if the motor vehicle is braked, in the step S12, or if the longitudinal acceleration exceeds 0.25, i.e., if the motor vehicle is braked, in the step S14, then the present weight value WT is maintained.

Generally, the weight value WT is 0 when the motor vehicle is at rest, i.e., when the foot brake is turned on. With such a setting, however, no reduction in the pneumatic tire pressure can be detected when the foot brake suffers an "ON-failure". To alleviate this shortcoming, when an "ON-failure" is detected, the weight value WT is set to 0.5 to enable the pneumatic tire pressure change detecting system to detect a reduction in the pneumatic tire pressure. When the foot brake suffers an "OFF-failure" because errors contained in the wheel speeds are large, tending to cause the pneumatic tire pressure change detecting system to malfunction, the weight value WT is set to 0 insofar as the motor vehicle is decelerated with the longitudinal acceleration being 0.3 or less.

The first steering angle converter 71 may be arranged to modify the weight value in response to detection of an accelerator failure rather than a brake failure. Each of the second steering angle converter 32, the third steering angle converter 42, and the sixth subtractor 46 may also incorporate the brake sensor 21 and the brake failure detector 64, and may also be arranged to carry out the process of modifying a weight value as shown in FIG. 5.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A system for detecting a change in the pneumatic pressure of a tire on a motor vehicle, comprising:

wheel speed difference detecting means for detecting an actual rotational wheel speed difference between rotational speeds of left and right wheels, either front or rear, on a motor vehicle;

motion condition detecting means for detecting a motion condition of the motor vehicle;

adequate wheel speed difference calculating means for calculating an adequate wheel speed difference based on an output signal from said motion condition detecting means;

comparing means for comparing said actual wheel speed difference and said adequate wheel speed difference with each other and determining the pneumatic pressure of a tire of one of said left and right wheels as being lowered if a difference between said actual wheel speed difference and said adequate wheel speed difference exceeds a predetermined value;

running condition determining means for determining a running condition of the motor vehicle; and comparative sensitivity modifying means for modifying a comparative sensitivity with which a reduction in the pneumatic pressure of the tire is determined, according to the running condition determined by said running condition determining means.

2. A system according to claim 1, further comprising:

brake detecting means for detecting a braking of the motor vehicle and supplying a signal indicative of the detected braking to said running condition determining means; and failure detecting means for detecting a failure of said brake detecting means;

said comparative sensitivity modifying means comprising means for modifying said comparative sensitivity according to the running condition determined by said running condition determining means if said failure detecting means detects a failure of said brake detecting means.

3. A system according to claim 1, further comprising:

first steering angle converting means for calculating an actual steering angle from said actual wheel speed difference;

said adequate wheel speed difference calculating means comprising second steering angle converting means for calculating an adequate steering angle from said adequate wheel speed difference;

said comparing means comprising means for comparing said actual steering angle and said adequate steering angle with each other and determining the pneumatic pressure of the tire as being lowered if a difference between said actual steering angle and said adequate steering angle exceeds a predetermined value.

4. The system according to claim 1, wherein said running condition determining means for determining a running condition of the motor vehicle determines based upon at least one kind of data selected from the group consisting of steering angle data, vehicle speed data, acceleration data, gear position data, and braking data.

5. A system for detecting a change in the pneumatic pressure of a tire on a motor vehicle, comprising:

wheel speed difference detecting means for detecting an actual rotational wheel speed difference between rotational speeds of front and rear wheels on a motor vehicle;

motion condition detecting means for detecting a motion condition of the motor vehicle;

adequate wheel speed difference calculating means for calculating an adequate wheel speed difference based on an output signal from said motion condition detecting means;

comparing means for comparing said actual wheel speed difference and said adequate wheel speed difference with each other and determining the pneumatic pressure of a tire of one of said front and rear wheels as being lowered if a difference between said actual wheel speed difference and said adequate wheel speed difference exceeds a predetermined value;

running condition determining means for determining a running condition of the motor vehicle; and comparative sensitivity modifying means for modifying a comparative sensitivity with which a reduction in the pneumatic pressure of the tire is determined, according to the running condition determined by said running condition determining means.

6. A system according to claim 5, further comprising:

brake detecting means for detecting a braking of the motor vehicle and supplying a signal indicative of the detected braking to said running condition determining means; and failure detecting means for detecting a failure of said brake detecting means;

said comparative sensitivity modifying means comprising means for modifying said comparative sensitivity according to the running condition determined by said running condition determining means if said failure detecting means detects a failure of said brake detecting means.

7. A system according to claim 5, further comprising:

actual slippage detecting means for detecting an actual amount of slippage between said front and rear wheels;

said adequate wheel speed difference calculating means comprising slippage estimating means for producing an estimated amount of slippage between said front and rear wheels;

said comparing means comprising means for comparing said actual amount of slippage and said estimated amount of slippage with each other and determining the pneumatic pressure of the tire as being lowered if a difference between said actual amount of slippage and said estimated amount of slippage exceeds a predetermined value.

8. The system according to claim 5, wherein said running condition determining means for determining a running condition of the motor vehicle determines based upon at least one kind of data selected from the group consisting of steering angle data, vehicle speed data, acceleration data, gear position data, and braking data.

* * * * *